United States Patent
Ebner et al.

(10) Patent No.: US 12,190,580 B2
(45) Date of Patent: Jan. 7, 2025

(54) SYSTEM AND METHOD TO CREATE CONFIGURABLE, CONTEXT SENSITIVE FUNCTIONS IN AR EXPERIENCES

(71) Applicant: CareAR Holdings LLC, Norwalk, CT (US)

(72) Inventors: Fritz Ebner, Pittsford, NY (US); Ashish Tisgaonkar, Rochester, NY (US)

(*) Notice: Subject to any disclaimer, the term of this patent is extended or adjusted under 35 U.S.C. 154(b) by 43 days.

(21) Appl. No.: 17/804,750

(22) Filed: May 31, 2022

(65) Prior Publication Data
US 2023/0401847 A1 Dec. 14, 2023

(51) Int. Cl.
| | | |
|---|---|---|
| G06V 20/20 | (2022.01) | |
| G06T 3/4038 | (2024.01) | |
| G06T 7/33 | (2017.01) | |
| G06T 7/73 | (2017.01) | |
| G06V 20/40 | (2022.01) | |

(52) U.S. Cl.
CPC ............ *G06V 20/20* (2022.01); *G06T 3/4038* (2013.01); *G06T 7/337* (2017.01); *G06T 7/74* (2017.01); *G06V 20/41* (2022.01)

(58) Field of Classification Search
CPC .......... G06V 20/20; G06V 20/41; G06T 7/74; G06T 7/337; G06T 3/4038
See application file for complete search history.

(56) References Cited

U.S. PATENT DOCUMENTS

| | | | | |
|---|---|---|---|---|
| 9,824,495 | B2* | 11/2017 | Hagbi | .................... G06T 19/006 |
| 10,607,084 | B1* | 3/2020 | Tang | .................... G06F 16/7837 |
| 11,393,200 | B2* | 7/2022 | Sinclair | ................. G06V 10/462 |
| 11,586,286 | B1* | 2/2023 | Singh | ...................... G06F 3/013 |
| 11,720,380 | B1* | 8/2023 | Singh | ..................... G06T 19/006 715/705 |
| 2015/0062123 | A1* | 3/2015 | Yuen | ......................... G06T 19/20 345/420 |
| 2018/0203112 | A1* | 7/2018 | Mannion | ................ H04R 1/406 |
| 2018/0205963 | A1* | 7/2018 | Matei | ............... H04N 21/85406 |
| 2019/0098725 | A1* | 3/2019 | Sadwick | .................... F21S 2/00 |
| 2019/0206565 | A1* | 7/2019 | Shelton, IV | ........... A61B 90/37 |
| 2019/0250873 | A1* | 8/2019 | Blume | .................... G16H 20/40 |
| 2021/0019526 | A1* | 1/2021 | Sinclair | ................. G06T 1/0021 |
| 2021/0091852 | A1* | 3/2021 | Parangattil | ............. G06V 20/20 |

(Continued)

*Primary Examiner* — Abderrahim Merouan
(74) *Attorney, Agent, or Firm* — Jon Gibbons; Fleit Intellectual Property Law

(57) ABSTRACT

A system for performing functions in AR experiences is provided having a computer receiving an image of a monitored device having at least one object; the computer processes said image to determine a plurality of feature points; a database is in data communication with said computer and stores a plurality of reference images with reference feature points and reference object zones, each having a property; the computer matches at least some of the plurality of feature points with at least some of the plurality of reference feature points to compute a homography matrix; the computer transforms the image into a transformed image using the homography matrix; the computer identifies an object zone in the transformed image based on the reference object zone; the computer determines an object state by processing a sub-image in the object zone of the transformed image based on the property associated with the reference object zone.

19 Claims, 9 Drawing Sheets

(56) References Cited

U.S. PATENT DOCUMENTS

2021/0264669 A1* 8/2021 Shreve ................... G06T 7/70
2021/0342479 A1* 11/2021 Schluntz ............... H04L 63/107
2021/0383551 A1* 12/2021 Fiala ..................... G06T 7/13

* cited by examiner

SYSTEM AND METHOD TO CREATE CONFIGURABLE, CONTEXT SENSITIVE FUNCTIONS IN AR EXPERIENCES

TECHNICAL FIELD

The present teaching relates to a system and method to create configurable, context sensitive functions in augmented reality experiences.

BACKGROUND

Augmented reality systems can be used to provide users with instruction workflows that help a user to perform tasks. Tasks can include validation steps, where the system can help detect whether the desired result of the task has been completed.

The "desired result"—or "end state" may be a special case of what can be termed "object states." An object state can be any detection of an object which can be differentiated from other states. For example, an object state might comprise a door which is open or closed, or a switch which is on or off.

Object states may be detected using a computer vision approach which employs deep learning networks. Currently, object states are only used to confirm that a task has been accomplished, for example if the back door of a printer has been opened, or if a toner drum has been removed (see, e.g., FIGS. 3A-3D). However, the notion of object state can be thought of as the 'context' of the object that allow an understanding of a global state of an object.

In addition to state verification for task completion in an AR task or decision tree, there is a collection of other activities that may need to be accomplished after the state of an object is detected. A system and method have been created that allows creation of context sensitive functions that will occur based on detection of state. Presentation of the result of the context sensitive function is specific to what that function does and is configured as part of a training session that builds an object model.

Many devices have LED status panels, panels of text, switch panels with plug-in cables, and states which can be dangerous, all of which can be used to create context sensitive functions.

SUMMARY

Accordingly, what is needed is a system and method for creating configurable, context sensitive functions in augmented reality experiences.

The system and method should minimize the chance of misdetection of an object, not be cumbersome or overly computationally expensive, and avoid confusing multiple objects.

In one aspect of the present teaching, a system for performing functions in AR experiences is provided, having a computer configured to receive an image of a monitored device having at least one object. The computer is configured to process said image to determine a plurality of feature points. A database is in data communication with said computer and is configured to store a plurality of reference images with reference feature points and reference object zones, each reference object zone having a property associated therewith. The computer is configured to match at least some of the plurality of feature points with at least some of the plurality of reference feature points to compute a homography matrix. The computer is configured to transform the image into a transformed image using the homography matrix. The computer is configured to identify an object zone in the transformed image based on the reference object zone. The computer is configured to determine an object state by processing a sub-image in the object zone of the transformed image based on a property associated with the reference object zone.

Additional features and aspects of the present teachings will become apparent from the following detailed description of illustrative embodiments that proceeds with reference to the accompanying drawings. This summary is not intended to limit the scope of the present teachings, which is defined by the claims.

DETAILED DESCRIPTION

The present teachings are described more fully hereinafter with reference to the accompanying drawings, in which the present embodiments are shown. The following description is presented for illustrative purposes only and the present teachings should not be limited to these embodiments. Any system configuration, device configuration, or processor configuration satisfying the requirements described herein may be suitable for implementing the system and method to validate task completion of the present embodiments.

For purposes of explanation and not limitation, specific details are set forth such as particular structures, architectures, interfaces, techniques, etc. in order to provide a thorough understanding. In other instances, detailed descriptions of well-known devices and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

Figure 1:
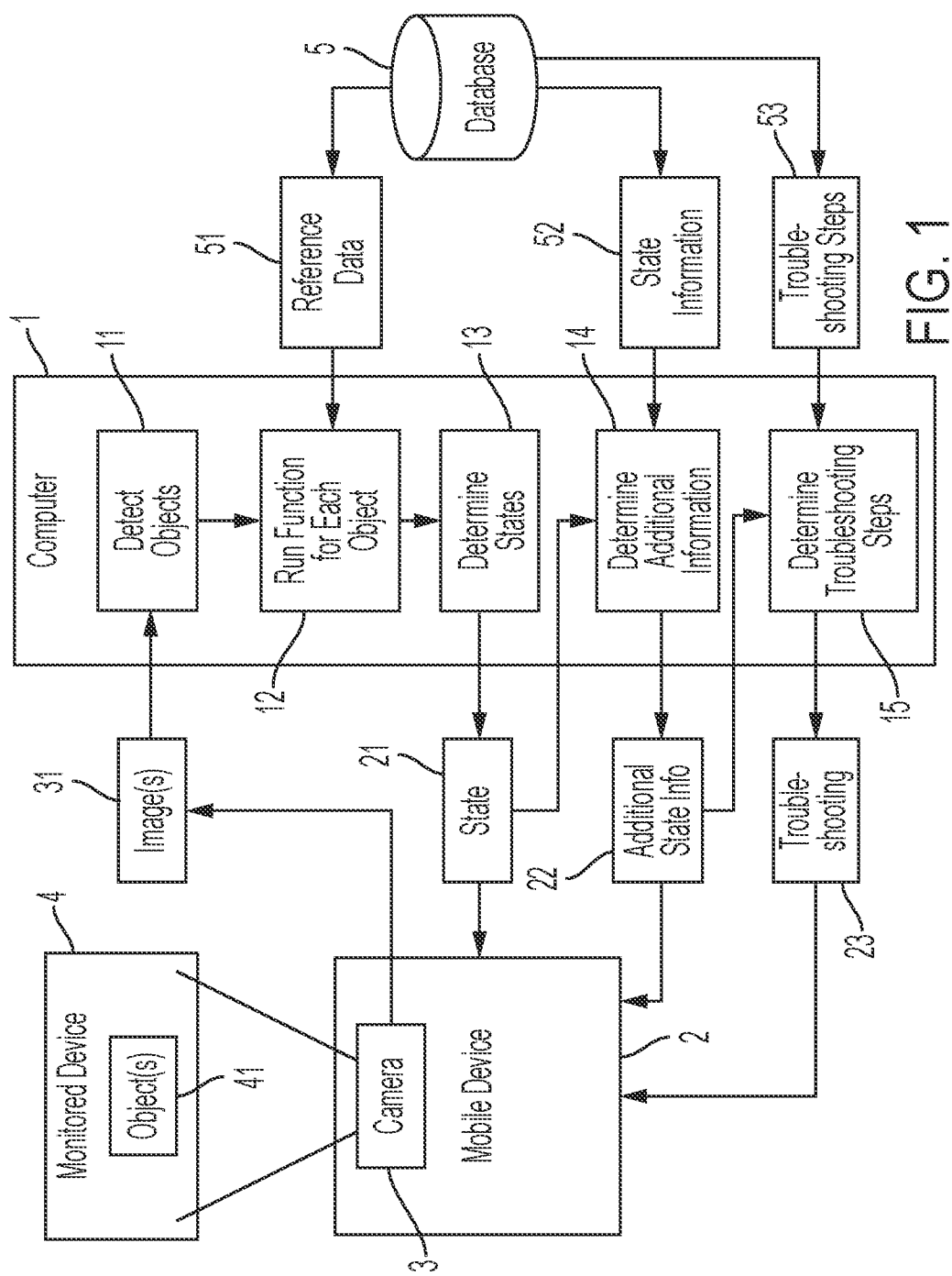
FIG. 1 is a schematic diagram of the presently disclosed system.

Referring to the figures in detail and first to FIG. 1, a system and method are provided to create configurable, context sensitive functions in augmented reality experiences. The system includes a computer 1, a monitored device 4, and a database 5.

The computer 1 may include a processor, computer, remote computer, computer server, network, or any other computing resource. The computer 1 may include memory, input/output devices, storage, and communication interfaces—all connected by a communication bus. The storage may store application programs and data for use by the computer 1. Typical storage devices include hard-disk drives, flash memory devices, optical media, network and virtual storage devices, and the like. The communication interfaces may connect the system to any kind of data communications network, including either wired networks, wireless networks, or a combination thereof. The memory may be random access memory sufficiently large to hold necessary programming and data structures of the disclosed subject matter. The memory may constitute a single entity or comprise a plurality of modules. The input/output devices may be used to update and view information stored in a database 5, as described later in more detail The computer 1 may be in communication with the mobile device 2. The mobile device 2 may be a computer, laptop, smartphone, tablet, or other electronic device capable of transmitting data to or receiving data from the computer 1. The mobile device 2 may include a processor, computer, remote computer, computer server, network, or any other computing resource.

The system may be configured to communicate through a network with the mobile device 2 that is associated with a user who is using the system. The network may comprise a local-area network (LAN), a wide-area network (WAN), metropolitan-area network (MAN), and/or the Internet, and further may be characterized as being a private or public network. The mobile device 2 may be a mobile phone, smart glasses, AR/VR glasses, personal digital assistant, tablet, laptop, or the like. However, in other embodiments, the mobile device 2 may be a non-mobile device, for example a desktop computer. The mobile device 2 contains an application(s) which, when executed by a processor of the mobile device 2, delivers information from the system to the user and provides real-time guidance. The application(s) of the mobile device 2 generates graphical user interfaces for presenting information regarding the system, as discussed in more detail below, and facilitates user interaction with the graphical user interfaces(s) as described herein.

The mobile device 2 may have a camera 3. The camera 3 may be capable of taking still photographs or video. For example, the camera 3 may include a CCD sensor, a CMOS sensor, or a combination of both. The camera 3 is adapted to capture at least one static image, or a video (a plurality of moving images), or a combination of both of the monitored device 4. The mobile device 2 may transmit the images 31 from the camera to the computer 1. The transmission may be real-time, or may be delayed. Alternatively, the mobile device 2 may be a camera 3, and the images 31 may be stored in memory before being accessed for use as part of the system.

The camera 3 is used to take images 31 of a monitored device 4 and objects 41 thereon. Monitored device 4 may be any type of device with objects 41 such as light indicators, panels of text, panels of switches, panels of cables, or potentially dangerous objects. For example, monitored device 4 may be a modem, router, printer, laptop, refrigerator, screen, sticker, brake caliper, or any other device. As will be understood, a monitored device 4 may have any number of objects thereon.

Light indicators are preferably LEDs, given their incorporation into many devices today. Each LED indicator may correspond to a state of the device. For example, an LED may show if a device is on or off. Some LEDs may blink to communicate a state. Some LEDs may change colors to communicate a state. Combinations of LED states may indicate a condition of the device 4. For example, where the device is a router, an LED may be used to show an ON/OFF state, whether the router is transmitting/receiving, whether the router is connected to the internet, or whether the router has devices connected.

Panels of text may be on devices, nameplates, or screens. In another example, a nameplate may show a product number, a serial number, a product name, software version, or other information regarding a product. Switches or buttons may show the state of a device. For example, on an electronic device, a switch or button may show whether the device is in an ON/OFF state, or specific settings of a device. Cables may be plugged into cable sockets the device or used accessorily. For example, on an electronic device, a cable plugged in may indicate the device has power or is connected to another device, or the lack of a cable may indicate the opposite. Some cables have LEDs that indicate status, which may also be pertinent to a device's state. Potentially dangerous objects may include any knobs, pipes, etc., which may be hot, cold, or otherwise pose a hazard.

The computer 1 may also be in communication with a database 5. The database 5 may store information regarding the system. The database 5 may be a storage drive or array accessible to computer 1, or cloud storage. The database 5 may be integrated into the computer 1, or the mobile device 2. The database 5 may store reference data, state information and/or troubleshooting steps.

The computer 1 receives an image 31 taken by camera 3. This may be a still photograph or a frame of a video. The image 31 may be received over a network, such as the Internet, a WAN, a LAN, Bluetooth, or any other known network. The image 31 may be received via a memory card or USB memory device. Any receiver may forward the image 31 to the computer 1.

The computer 1 may use deep learning to recognize objects in the image 31. The deep learning may comprise a machine learning processor, a deep learning accelerator, an AI accelerator, and/or neural processor. The deep learning may be built on machine learning and/or artificial intelligence and may be based on artificial neural networks with representation and/or reinforcement learning. In some embodiments, the deep learning is a separate deep learning machine that uses neural networks. In some embodiments, the deep learning module may comprise computer instructions executable on a processor for determining an object. The deep learning module may include computer vision (with pattern recognition capability, for example) and may be trained to visually detect objects/components of the monitored device and their respective states and conditions from the image(s) 31. In addition, or alternatively, the deep learning may be trained to visually detect the monitored device as a whole and determine its state or condition from the image(s) 31.

The deep learning is configured to analyze the image 31, specifically identifying an object of the monitored device 4 within the image(s) 31 and detecting a state of the object by comparing the image(s) 31 to at least reference data 51. For example, in systems that use homography-based image alignment and registration, the database 5 may store reference images with reference feature points. The reference data 51 may include predetermined labels and bounding boxes for an object of a monitored device 4. To generate reference images with reference feature points 51, a picture is taken from a detected object bounding box to configure the detection parameters. Parameters may be generated to indicate where objects are in the sub-image defined by the bounding box. Feature points 51 may be extracted and saved from the sample image using a known algorithm, for example SIFT or SuperPoint.

Figure 4:
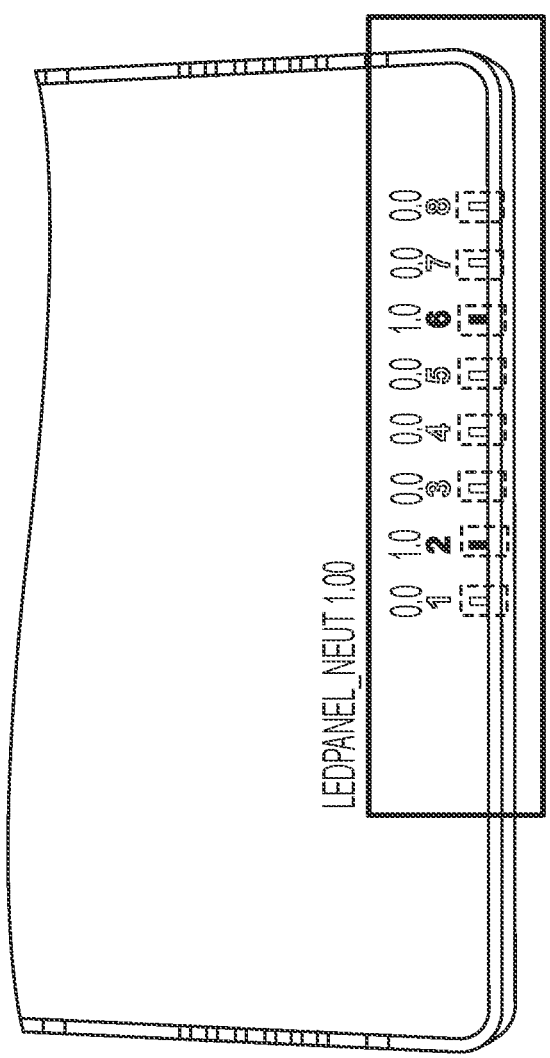
FIG. 4 is an example of an LED panel on an electronic device, with LEDs 2 and 6 in the "on" state, and an augmented reality overlay.

In such a system, the computer 1 may retrieve reference images with reference feature points and reference zones 51 from the database 5. A sample reference image is shown in FIG. 4. The reference images with reference feature points and reference zones 51 may include predetermined labels and bounding boxes for an LED panel of a device 4. To generate reference images with reference feature points and reference zones 51, a picture is taken from a detected object bounding box to configure the detection parameters. Deep learning may be used to identify the object and specific features thereof. Parameters may be generated to indicate reference zones where the features may be located and properties thereof. Feature points 51 may be extracted and saved from the sample image using a known algorithm, for example SIFT or SuperPoint.

For example, in the case of an LED panel, to generate reference images with reference feature points and reference zones 51, a picture is taken from a detected 'LED panel' bounding box to configure the LED detection parameters. Deep learning may be used to identify the LED panel and specific LEDs. Parameters may be generated to indicate reference zones where LEDs are in the sub-image defined by the bounding box, and the colors of the LEDs.

The following text shows an example of an LED configuration:

```
{
    "Colors": [[254,79,6],[248,72,3]],
    "Locations":[[[95,117],[112,145]], [[132,117],[149,146]]]
    "Names":[« LED1 », « LED2 »]
}
```

Colors indicate the range of RBG values for LED ON colors to detect. Locations indicate the relative locations of LEDs in reference config image. Names indicate the LED name and can be related to semantics of an LED, e.g., a power LED or a switch activity LED, or some other status.

As another example, in the case of text, text generate reference images with reference feature points and reference zones 51, a picture is taken from a detected 'text zone' bounding box to configure the OCR detection parameters. Deep learning may be used to identify the text panels and specific portions of text. Parameters may be generated to indicate where reference text zones are in the sub-image defined by the bounding box, and for OCR parameters for each text zone. For example, if a string is known to have a particular format, OCR parameters may include a regular expression or other pattern matching algorithm as part of the deep learning. Feature points 51 may be extracted and saved from the sample image using a known algorithm, for example SIFT or SuperPoint.

The following text shows an example of an OCR configuration:

```
{
    "Locations":[[[95,117],[112,145]], [[132,117],[149,146]]]
    "Names":[« Serial Number », « Model Name »]
}
```

Locations indicate the relative locations of OCR fields in reference image. Names indicate the OCR field name and can be related to semantics of the object, e.g., a serial number or a model name, or some other information (e.g., fault numbers on an LCD screen).

Figure 8:
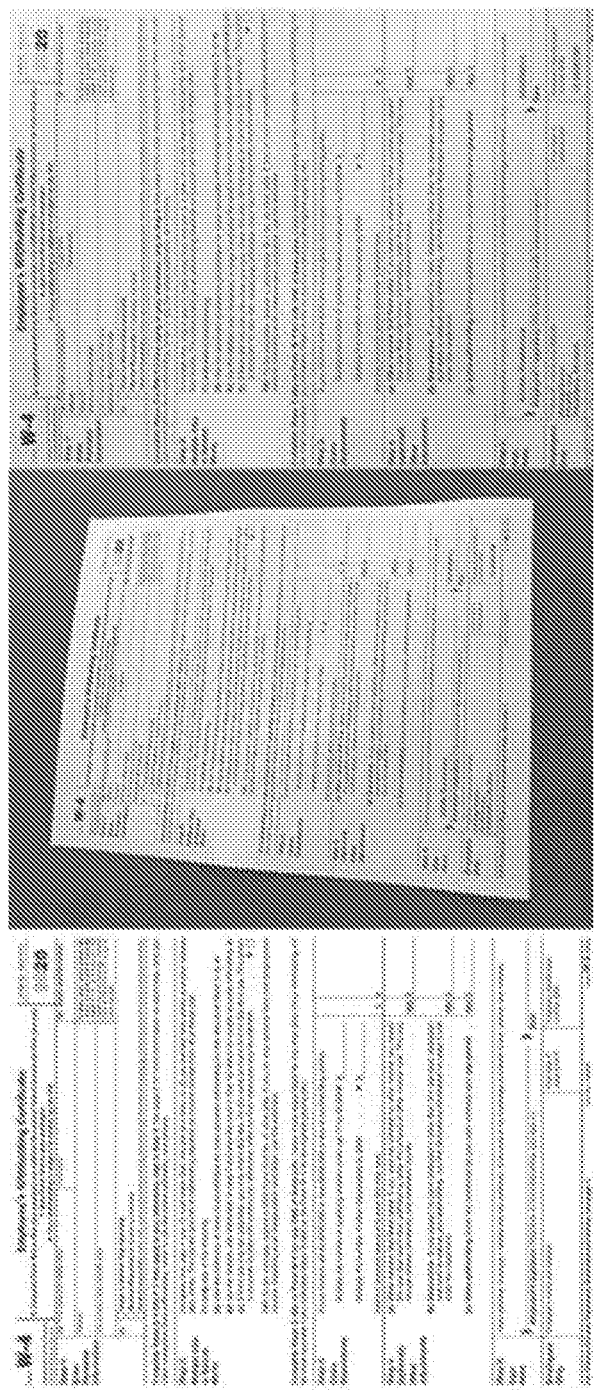
FIG. 8 is an example of a standard document (on the left), an image of a printout of that document (in the middle), and the result of homography of the image (on the right).

Image 31 is likely different from the reference image 51 in terms of the frame of reference. Therefore, there is a need to match image 31 to reference image 51. Image alignment and registration is known and can be performed using homography. Homography works by capturing feature points and descriptions in a reference image, then matching them in a scanned sample, then creating a transform that warps the sample image to the reference image (or vice versa). In projective geometry, a homography is an isomorphism of projective spaces, induced by an isomorphism of the vector spaces from which the projective spaces derive. Homography may be used to determine a homography matrix to transform one image into the same perspective as another. As shown in FIG. 8, a known standard image may be provided on the left. An image, scan, or printout of that image may be provided in the middle. A corrected and remapped version of the image after homography is performed is shown on the right.

The computer 1 determines feature points 11 of the image 31. This may be performed by using a deep learning model for object detection that has been trained to detect the objects and states of a particular product. The deep learning model for object detection may determine a bounding box whose label is associated with an object in an image. The computer 1 may then extract a sub-image, and determine feature points using a known algorithm (e.g., SIFT or SuperPoint).

The computer 1 may then determine 13 a state of an object. The state of the object may vary based on the type of object. For example, LEDs may be on, off, blinking, or vary in color. Text may be extracted from an image to determine a state. The state of switches or plugged-in cables may be determined. The state of a dangerous object may be detected.

Computer vision may be used to determine states 13. For example, the brightness, contrast, color, or other property of the image 31 in the region of an object may be compared to a reference datum, such as reference values, and used to determine an object state. To determine color, the computer 1 may create a combined color mask from configured colors. The OpenCV inRange function, for example, may be used. The computer 1 may use connected component analysis on the color mask to detect color presence. If an object is moved or blinking, the computer 1 may run a time series analysis on successive frames of video. For example, a rolling window of the last 10 frames may be kept in memory by the computer 1 to determine movement or blinking. If OCR is required, the computer 1 may match the OCR results with a regular expression or other pattern matching algorithm to validate correct structure of resulting text. The computer 1 may optionally perform OCR several times on a zone and use a voting strategy to get higher confidence that the extracted text is correct.

The computer may provide the state 21 of the monitored device 4 to the mobile device 2 for display to the user.

Optionally, the computer 1 may determine 14 additional information regarding the state 21 of the monitored device 4. The computer may retrieve state information 52 from the database 5. Upon determining additional state information 22, the computer may provide the same to the mobile device 2. The mobile device 2 may display the additional state information 22 to the user. Additional state information 22 may include a warning regarding a potentially dangerous object.

Additional state information 22 may also regard a condition of the monitored device based upon the state of the object. For example, in the event of multiple LEDs that can be read together to determine a condition, i.e., a higher level meaning of the set of LED states. State information 52 may include a condition table based on LED states, from which computer 1 may then determine the device condition 14. The device condition may be provided to mobile device 2 as additional state information 22.

Optionally, the computer 1 may determine troubleshooting steps 15 based on the state 21 of the monitored device 4. The computer may retrieve troubleshooting steps 53 from the database 5. Upon determining troubleshooting steps 23, the computer may provide them to the mobile device 2. The mobile device 2 may display the troubleshooting steps 23 to the user. The troubleshooting steps 23 need not be based solely on the state 21, but may also be based on state information 22, including device conditions.

Figure 2:
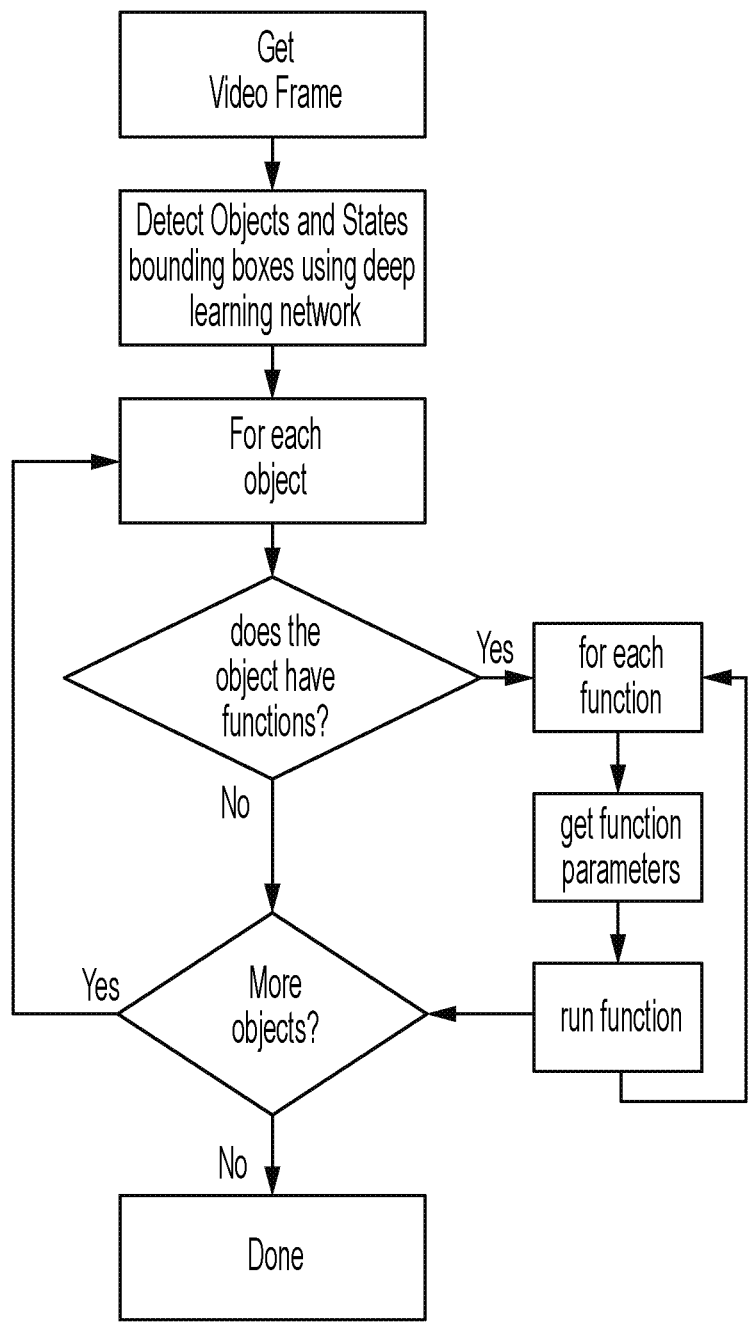
FIG. 2 is a schematic diagram of the presently disclosed system.

FIG. 2 shows a flowchart for this process. A video frame is retrieved. Objects and States bounding boxes are determined using a deep learning network. For each object, it is determined whether the object has a property which allows additional information to be extracted 12.

As one example shown in FIG. 4, many objects have LED panels to provide status. One configuration comprises an LED reading function. When an object/state is detected that has an 'LED panel' attribute, the LED reading function can be run. The LED reading function will detect each LED on the panel and tell the system whether the LED is on or off or blinking with some pattern. Each LED has a name, position and a potential action that is based on the LED's flashing state. The LED's flashing state could indicate and detect a fault state, and an action may trigger a message to be displayed or drive the user through some path in a task's decision tree.

Figure 5:
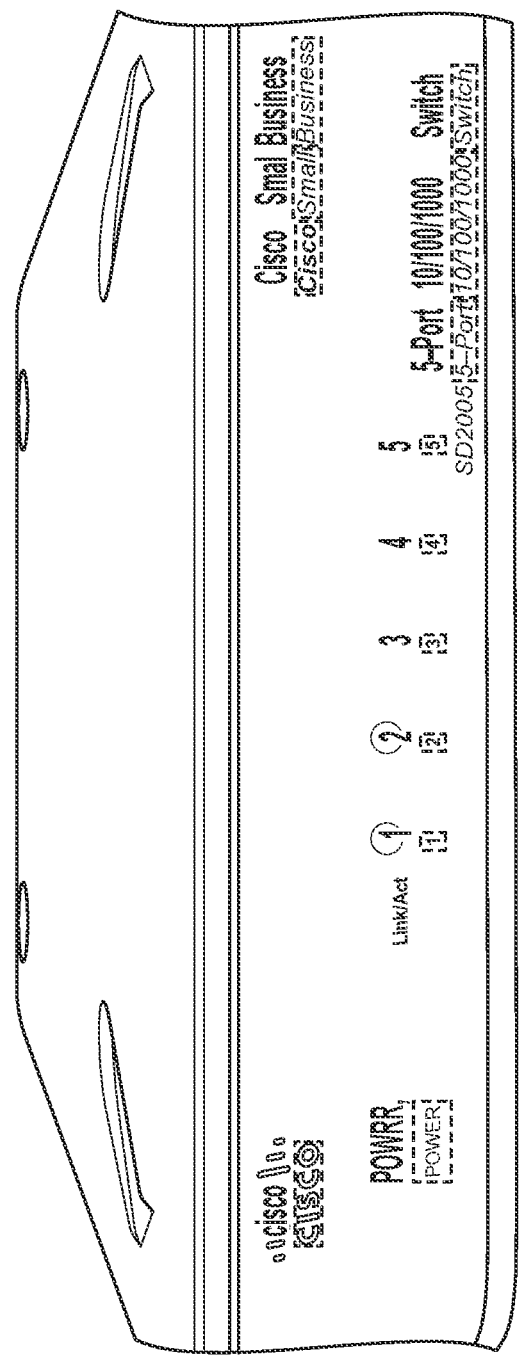
FIG. 5 is an example of multiple regions of text on an electronic device, with detected text overlaid above bounding boxes.
Figure 6:
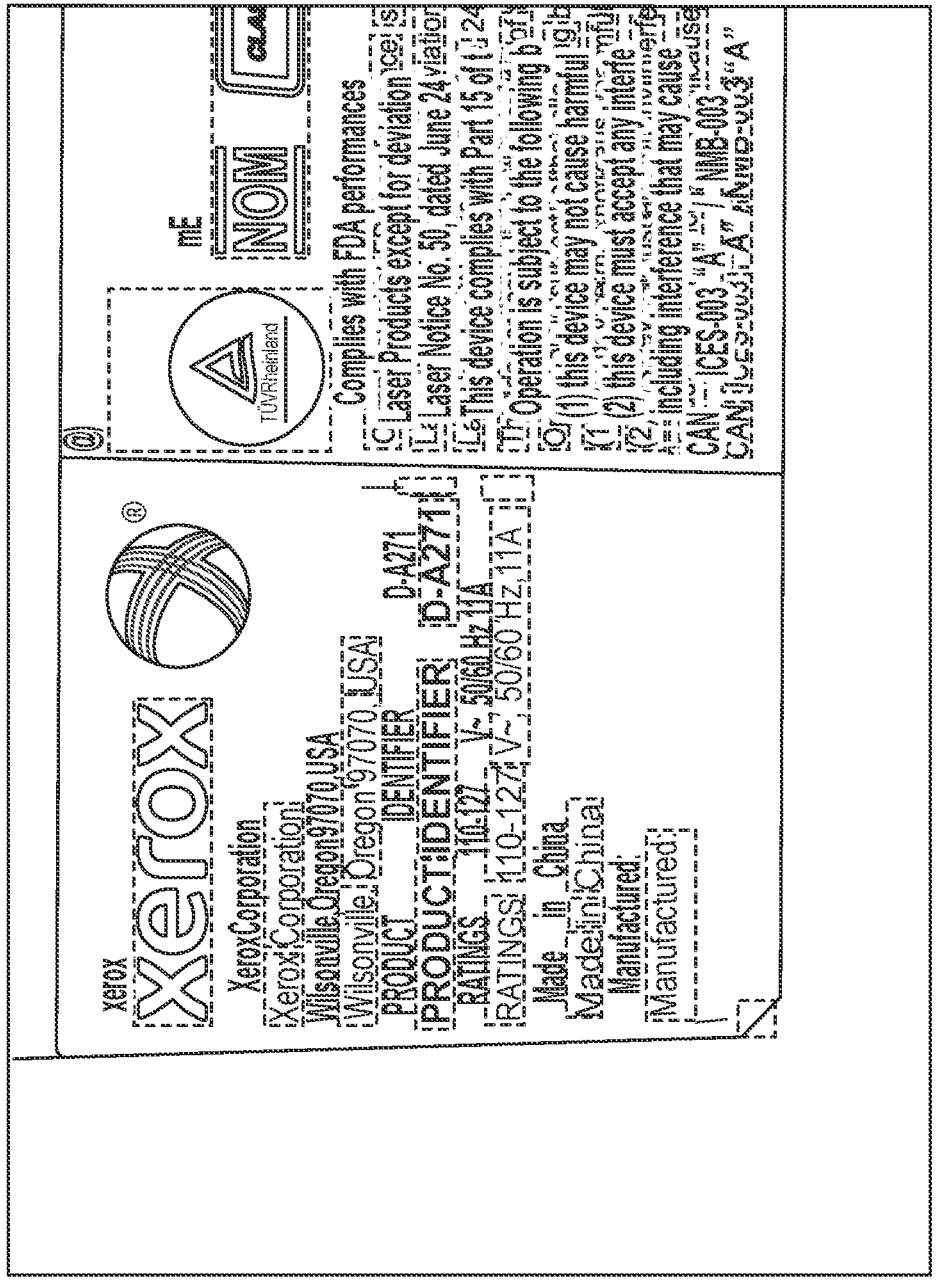
FIG. 6 is an example of multiple regions of text on a nameplate, with detected text overlaid above bounding boxes.

As another example shown in FIGS. 5 and 6, objects have regions with human readable text, both static and dynamic. Another configuration is a text reading function. When an object/state is detected which is tagged as OCR-able, the bounding box of the detected object/state will be fed into an OCR function and the text results returned for further processing. Each OCR region has a set of text and potential action(s) that are based on the OCR region's results. The action may trigger a message to be displayed or drive the user through some path in a task's decision tree.

Figure 7:
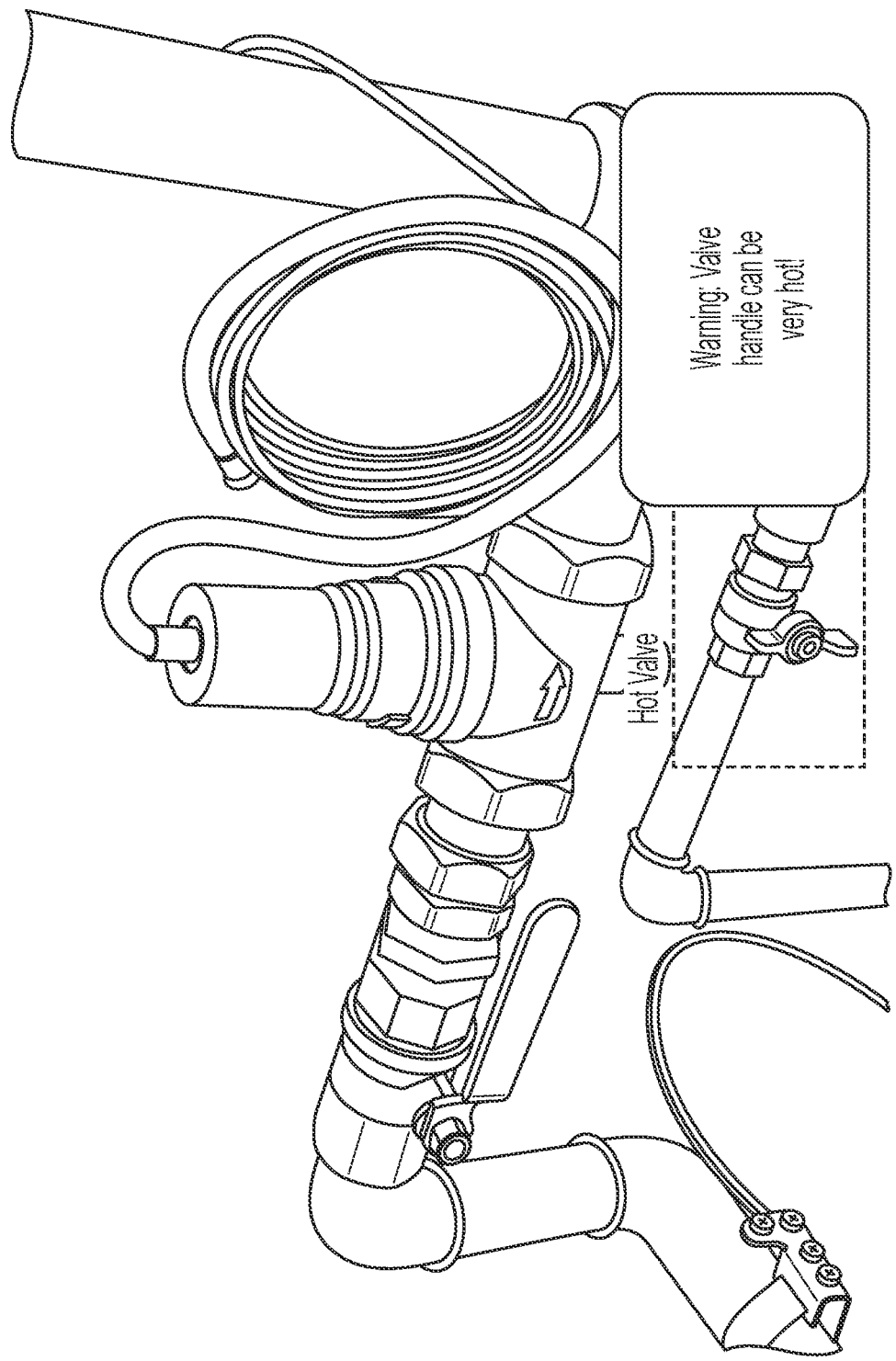
FIG. 7 is an example of a warning overlaid over a detected dangerous physical object.

As another example shown in FIG. 7, many objects have states that can be dangerous, for example if a door is open which exposes a moving (or a very hot) part or if a switch is in an on position that provides power that can produce an electric shock. When a warning object/state is detected, a message can be shown to the user telling them to be careful.

Figure 3B:
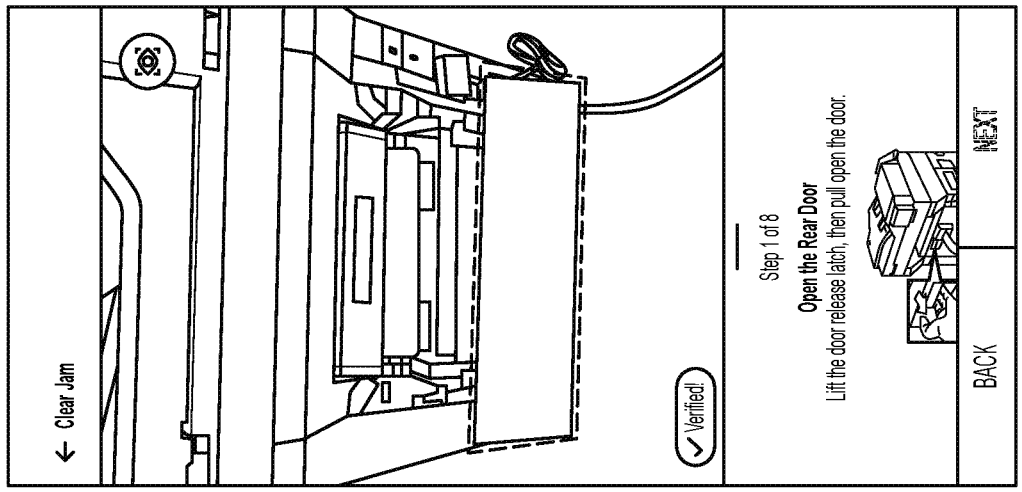
FIG. 3A-3D illustrate an example of how the system for validating workflow task completion, according to some embodiments, provides augmented reality (AR) guidance to a user(s) for progressing through workflow task steps and validates workflow task completion.
Figure 3A:
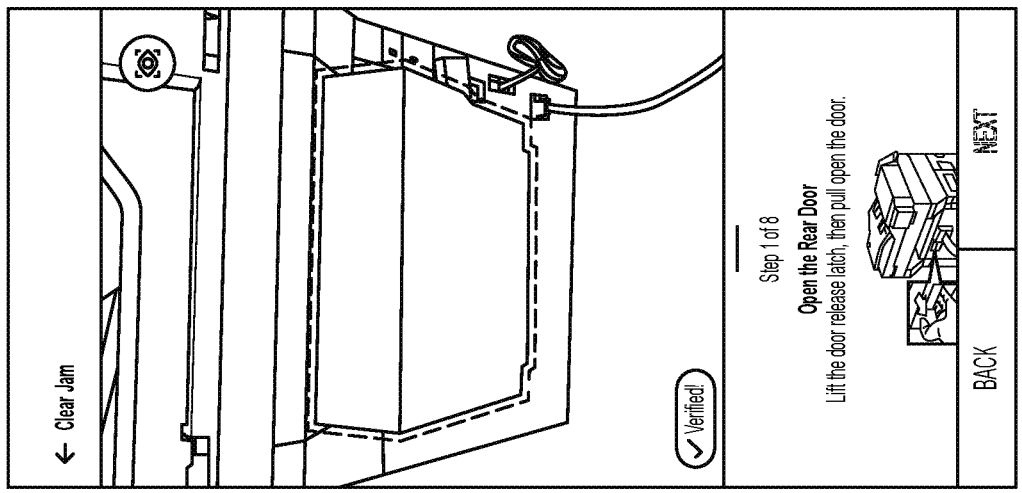

As another example, many objects have switches, buttons, or plugged-in cables on panels that can be provide object status. When an object/state is detected that has an 'switch panel,' 'button panel,' or 'cable panel' attribute, the appropriate reading function can be run. The reading function will detect each switch, button, or cable, on the panel and tell the system whether they are on, off, or in one of a variety of states. Each switch, button, or cable has a name, position and a potential action that is based on the state. The state could indicate and detect a fault state, and an action may trigger a message to be displayed or drive the user through some path in a task's decision tree The system and method disclosed may be used as part of a task completion validation method. As an example, the states of objects can be used to determine next task steps. For example, in current systems, as shown in FIG. 3A, a "NEXT" button is disabled, which prevents the user from proceeding onto the next task step in the workflow until the current task step has been validated as complete. Once the user performs the current task step correctly, the task validation system validates the completion of the task step, at which point the graphical user interface is updated to display a "Verified" symbol, as shown in FIG. 3B. In addition, the "NEXT" button is enabled, thereby allowing the user to proceed to the next task step. Once the "NEXT" button is pressed, a user device may transmit a signal to the task validation system to indicate that it is ready to receive the next task step in the workflow. In other embodiments, once the current task step has been verified as being completed, the graphical user interface may automatically adjust its display to show the next task step, without waiting for the user to press the "NEXT" button.

Figure 3D:
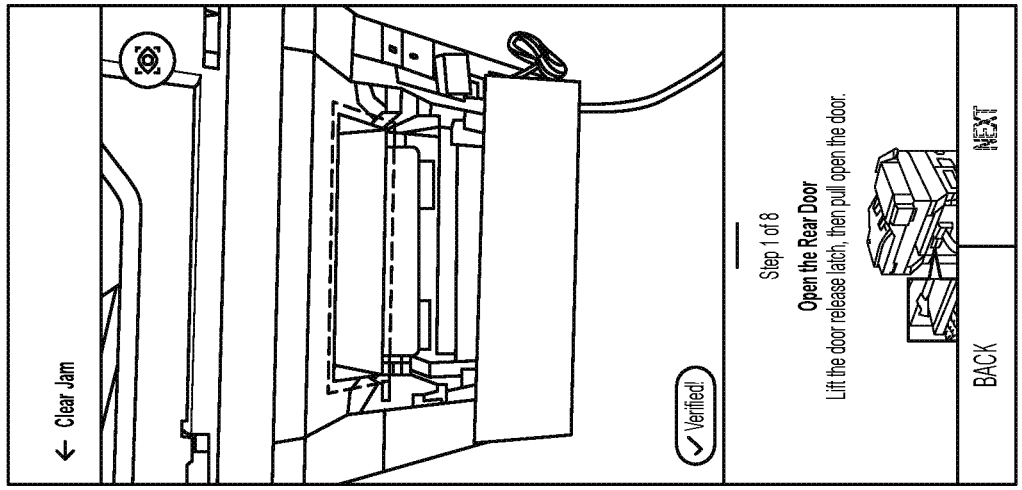
Figure 3C:
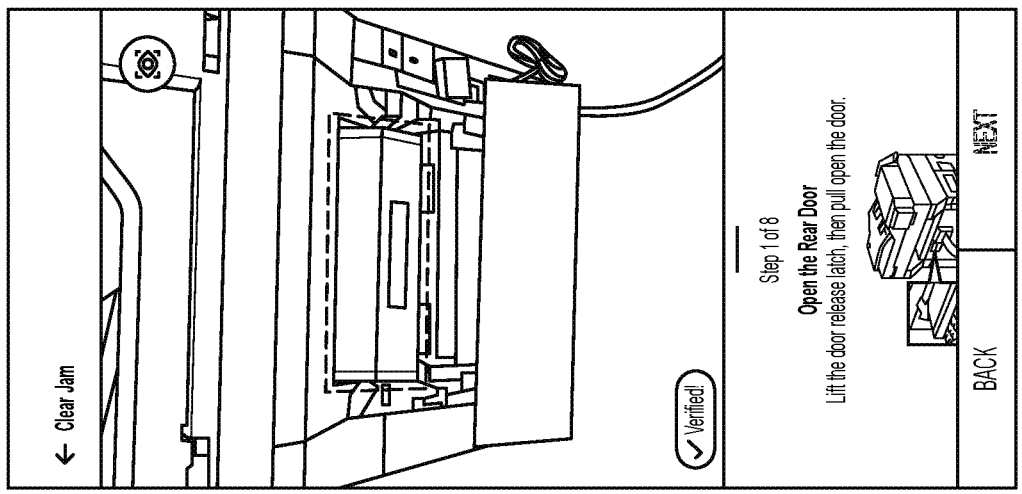

In FIG. 3C, the next task step is displayed by the graphical user interface and thus becomes the new current task step. In particular, the task step of "Remove the Toner Cartridge" is displayed, while the "NEXT" button is once again disabled. The augmented reality (AR) module superimposes a computer-generated highlighted outline (illustrated by dashed lines in FIG. 3C) around the relevant object of the monitored device (e.g., toner cartridge) that is associated with the current task step in order to assist the user in locating the object. Once the user performs the current task step correctly, the task validation system validates the completion of the task step, at which point the graphical user interface is updated to display a "Verified" symbol, as shown in FIG. 3D. In addition, the "NEXT" button is enabled, thereby allowing the user to proceed to the next task step.

The presently disclosed system can be used to supplement such a task completion validation method. For example, light indicators, panels text, switches, buttons, cables, or potentially dangerous objects each may have their own states regarding a monitored device.

The states of these objects may be used to supplement or traverse a decision tree for task completion.

As an example, a workflow for troubleshooting a product may be established by combining various functions discussed herein. To learn the identity of the product, the OCR function may first be used to determine a product name and serial number from a label. A state of a product can be determined by the LED function, such as whether an ON/OFF light is on. Switches, buttons, and cable functions can be used to determine additional errant settings. Finally, the dangerous objects can be searched for so appropriate warnings may be presented. With this information, or a subset thereof, appropriate troubleshooting tasks can be assigned to the user, and appropriate verification steps can be taken.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect. The present disclosure is to be considered as an example of the present teaching, and is not intended to limit the present teaching to a specific embodiment illustrated by the figures above or description below.

To aid the Patent Office and any readers of any patent issued on this application in interpreting the claims appended hereto, Applicant that it does not intend any of the claims or claim elements to invoke 35 U.S.C. 112(f) unless the words "means for" or "step for" are explicitly used in the particular claim.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings. In describing the present teaching, it will be understood that a number of techniques and steps are disclosed. Each of these has individual benefits and each can also be used in conjunction with one, more, or all of the other disclosed techniques. Accordingly, for the sake of clarity, this description refrains from repeating every possible combination of the individual steps in an unnecessary fashion. Nevertheless, the specification and claims should be read with the understanding that such combinations are entirely within the scope of the present teaching and the claims.

What is claimed is:

1. A system for performing functions in augmented reality (AR) experiences, comprising:
a computer configured to receive an image of a monitored device having at least one object, and to process the image to determine a plurality of feature points; and
a database in data communication with the computer,
the database configured to store a plurality of reference images with reference feature points and reference object zones, each reference object zone having a property associated therewith,
wherein the computer is further configured to:
match at least some of the plurality of feature points with at least some of the reference feature points from the plurality of reference images to compute a homography matrix;
transform the image into a transformed image using the homography matrix;
identify an object zone in the transformed image corresponding to a reference object zone of the reference object zones;
select a sub-image of the transformed image from the object zone, the sub-image selected based on the sub-image including one or more specified features of the at least one object determined from at least one of the reference images; and
determine an object state of the at least one object by processing the one or more specified features included in the sub-image based on the property associated with the reference object zone.

2. The system of claim 1, wherein the image is provided to the computer by a mobile device.

3. The system of claim 1, wherein the image is a still picture or a frame of a video of the monitored device.

4. The system of claim 1, wherein the at least one object includes at least one of a LED light, text, a switch, button, cable, or a potentially dangerous object.

5. The system of claim 4, wherein:
the image includes a picture of at least one LED light, and
wherein the computer is further configured to determine a state of the LED light by comparing the sub-image to a reference value.

6. The system of claim 5, wherein the state of the LED light is one of on, off, blinking, or associated with a particular color.

7. The system of claim 4, wherein:
the image includes a picture of a button or switch, and
wherein the computer is further configured to determine a state of the button or switch by comparing the sub-image to a reference value.

8. The system of claim 7, wherein:
the image includes a picture of at least one cable or a picture of a cable receptacle, and
wherein the computer is further configured to determine a state of the cable or the cable receptacle by comparing the sub-image to a reference value.

9. The system of claim 4, wherein:
the image includes a picture of text, and
wherein the computer is further configured to execute optical character recognition on the object zone of the transformed image to generate extracted text.

10. The system of claim 4, wherein:
the image includes a picture of a potentially dangerous object, and
wherein the computer is further configured to determine a state of the potentially dangerous object in the object zone by comparing the picture to the reference feature points.

11. The system of claim 10, wherein, if determined to be in a dangerous state, a user device is configured to display a warning regarding the potentially dangerous object.

12. The system of claim 1, wherein a user device is configured to display the object state of the at least one object.

13. The system of claim 1, the computer configured to provide troubleshooting instructions based on the object state of the at least one object.

14. The system of claim 1, wherein:
the image has a plurality of objects, and
wherein the computer is configured to:
identify a plurality of object zones in the transformed image, each associated with one of the plurality of objects, based on the reference object zones; and
determine an object state for each of the plurality of objects by processing the sub-image in each of the object zones of the transformed image by calling a function associated with a corresponding reference object zone of the reference object zones.

15. The system of claim 14, wherein the computer is further configured to identify a monitored device condition based on at least two object states from the object state determined for each of the plurality of objects.

16. The system of claim 14, wherein the computer is further configured to provide troubleshooting instructions based on a condition of the monitored device.

17. The system of claim 1, further comprising a receiver that accepts the image from a remote device and transmits the image to the computer.

18. A system for performing functions in augmented reality (AR) experiences, comprising:
a computer configured to receive an image of a monitored device having at least one object, and to process the image to determine a plurality of feature points; and
a database in data communication with the computer, the database configured to store a plurality of reference images with reference feature points and reference object zones, each reference object zone having a property associated therewith, wherein the computer is further configured to:
    match at least some of the plurality of feature points with at least some of the reference feature points from the plurality of reference images to compute a homography matrix;
    transform the image into a transformed image using the homography matrix;
    identify an object zone in the transformed image corresponding to a reference object zone of the reference object zones, wherein the reference object zone is predefined based on a machine learning model trained to recognize specific objects and their states;
    select a sub-image of the transformed image from the object zone, the sub-image selected based on the sub-image including one or more specified features of the at least one object determined from at least one of the reference images; and
    determine an object state of the at least one object by processing the one or more specified features included in the sub-image based on the property associated with the reference object zone.

19. The system of claim 18, wherein the computer is configured to determine the object state of the at least one object by:
    comparing the one or more specified features with a set of predefined states in the database.

\* \* \* \* \*